April 21, 1970 — R. A. SANDERSON — 3,507,702
FUEL CELL SYSTEM INCLUDING COOLING AND HUMIDIFYING MEANS
Filed Feb. 15, 1967 — 2 Sheets-Sheet 1

INVENTOR,
ROBERT A. SANDERSON

INVENTOR,
ROBERT A. SANDERSON

United States Patent Office 3,507,702
Patented Apr. 21, 1970

3,507,702
FUEL CELL SYSTEM INCLUDING COOLING AND HUMIDIFYING MEANS
Robert A. Sanderson, Thompsonville, Conn., assignor to United Aircraft Corporation, East Hartford, Conn., a corporation of Delaware
Filed Feb. 15, 1967, Ser. No. 616,369
Int. Cl. H01m 27/00
U.S. Cl. 136—86                                  7 Claims

ABSTRACT OF THE DISCLOSURE

A compact fuel cell system is described capable of operating an ambient air over the full load range of the system at ambient temperatures of from −45° to 125° F., and at any air relative humidity of from 0 to 100 percent. The system comprises a compact hydrogen air fuel cell stack, a cooling loop, a process air feed system, and a hydrogen fuel control system. The sub-assemblies are constructed integral with one another to permit the needed control of temperature and humidity conditions within the cell when operated within the designated ranges.

Field of invention and prior art

This invention relates to a fuel cell system for the electrochemical generation of electricity directly from a fuel and oxidant. More particularly the invention is directed to a compact system capable of operating on ambient air over the full load range of the system at ambient temperatures ranging from −45° F. to 125° F. and at any air relative humidity ranging from 0 to 100%.

A fuel cell of the type with which this invention is concerned produces an electromotive force by bringing an oxidant and a fuel in contact with two suitable electrodes and an electrolyte. A fuel such as gaseous hydrogen is introduced at one electrode where it reacts electrochemically with the electrolyte to impart electrons to the fuel electrode. Simultaneously an oxidant such as air is introduced to the second electrode where it reacts electrochemically with the electrolyte to consume electrons at the oxidant electrode. Connecting the two electrodes through an external circuit causes an electrical current to flow in the circuit and withdraws electrical power from the cell. The overall fuel cell reaction produces electrical energy which is the sum of the separate half cell reactions. A by-product of the reaction is formed as well as some heat.

Commercial fuel cells have been suggested wherein numerous fuel cell units are connected together to provide a battery capable of supplying electricity at various voltages and currents. To be practical, however, at least for many requirements, the battery must be compact and made of lightweight materials. Additionally, it is desirable that the cell employ air as the oxidant rather than pure oxygen both from an economic standpoint and to avoid the need for ancillary equipment for supplying oxygen to the cells. Furthermore, a cell must be capable of operating at relatively extreme temperature ranges and at substantially any air relative humidity.

The use of air and the need to operate over wide temperature and relative humidity ranges produce serious problems. Thus in the event an aqueous alkali or other carbonate forming electrolyte is used the carbon dioxide must be removed to prevent fouling of the electrolyte and the overall cell. Furthermore, when ambient air is introduced into a cell either in cold, dry regions or hot, humid regions the proper humidity and operating temperature of the cell cannot be maintained. For example, in cold, dry regions the ambient air draws water from the electrolyte. In cells employing a trapped electrolyte, i.e., where the electrolyte is retained in a matrix, the drying of the matrix can cause a loss in performance due to a shift in the electrolyte-gas interface within the electrodes or damage due to excessive heating. Moreover, water depletion from the electrolyte reduces the efficiency of the cell in that the electrolytic conductivity is lowered and the tendency for gas crossover in the cell is increased. Where the relative humidity is high, the moisture from the cell will build up and can result in electrode flooding.

Objects and brief description

Accordingly, it is an object of the present invention to provide a method of generating electricity directly from a fuel and air at ambient temperatures ranging from −45° F. to 125° F., at air relative humidities of from 0 to 100%.

It is another object of the present invention to provide a fuel cell system for operating on a fuel and ambient air at ambient temperatures ranging from −45° F. to 125° F. at air relative humidities of from 0 to 100%.

It is another object of the present invention to provide a fuel cell system for operation on ambient air with means for pre-conditioning the air before it is brought into contact with the electrodes of the cell.

It is a further object of the present invention to remove carbon dioxide from the ambient air to provide more efficient fuel cell operation when using a carbonate forming electrolyte.

It is another object of the present invention to integrate the removal of water formed as a by-product of the cell with the fuel cell air supply.

It is another object of the present invention to provide means for removing the cell waste heat by circulating a coolant, such as ethylene glycol, through the cell stack.

It is another object of the present invention to integrate the air flow, humidity and temperature of the fuel cell system with the removal of water formed as a cell by-product.

It is a further object of the present invention to provide a fuel cell system having a positive means of heat and water removal which is independent of environment or load.

These and other objects of the invention will be more readily apparent from the following detailed description with particular emphasis being directed to the drawing.

The above and additional objects are accomplished by use of a fuel cell assembly comprising as sub-assemblies (a) compact hydrogen/air fuel cell stacks; (b) a cooling loop; (c) a process air feed system; and (d) a hydrogen flow control system. The aforesaid sub-assemblies are constructed and arranged integral with one another to effectively control the temperature and humidity conditions within the cell when operated at ambient temperatures of from −45° F. to 125° F. and where the air relative humidity is from 0 to 100%.

The compact air fuel cell employed in this system comprises two lightweight electrodes separated by an ion conductive electrolyte. The individual cells are separated by metal cooling plates with integral coolant flow passages. The cooling plates in conjunction with the adjacent electrode provide flow passages for reactant to the electrodes. Preferably the cooling plates will contact the electrodes and serve as current collectors. A plurality of cells, for example twelve more or less, are connected in series to form a cell stack. Preferably, all manifolding and electrical connections are within the stack. If necessary, to achieve the proper power output, a plurality of stacks can be connected in series or parallel.

In operation of the system, hydrogen, which may come from a pressure tank or directly from a converter where a hydrogen-containing material such as hydrocarbon or ammonia is broken down to produce hydrogen and by-products, is fed to the cell. A hydrogen regulating pressure valve is contained in the fuel line to regulate the flow of hydrogen to the cell stacks depending upon the load conditions. If a source of pure hydrogen is employed the gas passage can be dead ended within the cell, or if an impure hydrogen gas is used the impurities can be vented from the stack by suitable vent means.

In the presently described system cell heat and water removal functions are separate. Removal of the waste heat from the stacks is by means of the coolant loop. A mixture of glycol and water is preferably used as the coolant although other dielectric coolants such as silicone oils or flurocarbons can be used. The coolant loop includes a coolant pump and motor, a heat exchanger, the cell cooling plates, a by-pass control integral with the air saturator, a forced air-cooled radiator and a radiator by-pass control. The coolant enters the cell and passes through the coolant passages where the cooling plates absorb sensible heat and thereafter is removed from the cell. The coolant is then pumped to the forced-air radiator. During its passage to the radiator, however, the coolant is directed to the air saturator where a portion of the cell waste heat can be utilized to vaporize water to condition the process air. The coolant flow to the air saturator is controlled through a by-pass valve in the coolant side which senses and by directing the hot coolant from the cell to the saturator, maintains the saturator air exit temperature at the proper level. From the saturator the coolant flows to the air-cooled radiator where the remainder of the waste heat is rejected to ambient. Control of the heat rejection by the radiator is again through a by-pass valve which senses pump inlet temperature and maintains the proper temperature by ducting coolant flow around the radiator. The coolant is then pumped to the cell coolant manifold completing the loop.

The air supply system serves the dual purpose of supplying oxygen essential for the cell reaction and removing water which is a by-product of the cell reaction. The system comprises a filter, an air compressor pumping motor unit, air dump valve, air saturator, carbon dioxide scrubber and cell air manifolding distribution system. The air is taken from the ambient, passed through the filter and compressed by the compressor pumping unit. The pump delivers a constant flow of filtered air. Accordingly, an air dump valve is employed to automatically regulate the amount of air which is fed to the saturator for subsequent use in the cell, depending upon the requirements of the cell for the particular load being applied. The portion of air to be used in the fuel cells is directed to the saturator where it is heated and saturated to the proper temperature and humidity prior to entrance to the carbon dioxide scrubber. As noted, when considering the coolant loop system, heat for the saturator and control of the air exit conditions from the saturator over the range of loads and ambient conditions is provided by the integral coolant heat exchanger and by-pass control. After passage through the carbon dioxide scrubber the saturated, carbon dioxide-free air is pumped through the cells supplying oxygen for the reaction. Excess air is vented from the system and carries with it the water by-product of the cell. The amount of water which the air will remove from the cell is adjusted by the humidity of the air which is fed to the cell and the flow rate as controlled by the air dump valve.

As apparent from the aforesaid description, the present invention provides a convenient electrical supply system which can be operated at virtually any temperature or humidity without having a variation in the output of the cell. Additionally, the load on the cell can be modified anywhere within its capacity without need for voltage regulators, adjustors, and the like. Moreover, through the combined effect of humidifying the inlet fuel cell air and flowing the humidified air over the cathode, while at the same time removing the sensible heat from the cell by passing a coolant adjacent the reactant passages, the fuel cell product water is removed at more uniform electrolyte conditions. That is, the product water is withdrawn uniformly over the entire electrolyte-electrode area, greatly enhancing cell performance.

In order to more specifically illustrate the invention, reference is made to the accompanying drawing wherein like numerals are employed throughout to designate like parts.

The drawing and detailed description

Figure 2:
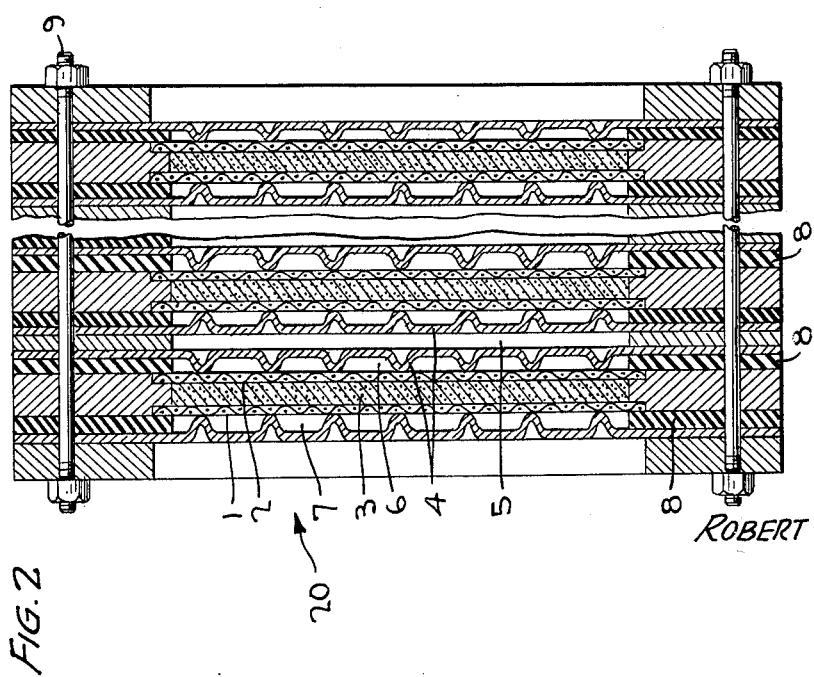
FIGURE 2 is a fragmentary diagrammatic section of a fuel cell stack.

More specifically, referring primarily to FIGURE 2 of the drawing, part of a fuel cell stack 20 comprising twelve cells in the stack is illustrated. Each cell comprises a cathode 1, and anode 2 and an aqueous alkali electrolyte retained in a suitable matrix 3. Each electrode comprises a metal support screen or mesh in intimate contact with a catalyst layer preferably comprising an admixture of catalyst and hydrophobic polymer binder. Each electrode is pressed against the matrix. Each cell is separated from the next cell by a cooling plate 4 with two of such plates making up coolant passage 5. The cooling plate which is dimpled presses into the electrode in the vicinity of each dimple and thus serves as an efficient current collector and furthermore provides means of conducting heat across the reactant gas passages. A cooling plate and anode 2 provides a hydrogen passage 6 adjacent the anode of each cell. A second cooling plate and cathode 1 provides an air passage adjacent the cathode 7 of each cell. Plastic spacers and gaskets 8 separate and insulate the various elements from each other. The entire stack is held together by nuts and bolts 9 which pass through the spacers and cell frame.

In the embodiment shown, the support screen of the electrodes comprises a fine nickel mesh having 10 milligrams of catalyst material per square centimeter of electrode area. Each electrode is 4.5 inches square. The catalyst material comprises 10 parts platinum black and 3 parts finely divided polytetrafluoroethylene. The catalyst and binder were intimately admixed to form a paste and the paste then rolled onto and into the nickel support screen. The electrode structure was heated to bond the polymer particles to each other and to the metal support frame. An entire cell including electrode, electrolyte matrix retaining an electrolyte, reactant passages and coolant passages has a pitch of 0.13 inch, or approximately 7 cells per inch. The cells are preassembled with cooling plate, electrodes and electrolyte matrix in one piece prior to assembling the entire cell stack.

Figure 3:
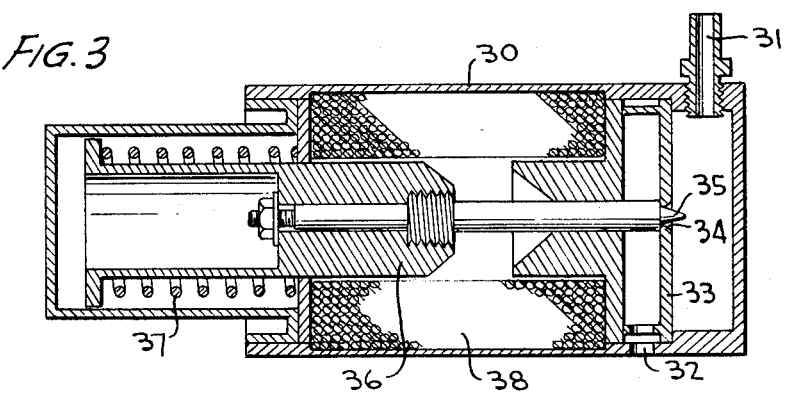
FIGURE 3 is a sectional view of an air volume control valve means of the type employed in the present fuel cell system.

The power system employing the aforesaid stacks is started up by feeding ambient air and hydrogen to the cells. A pressure regulator 10 supplies the proper flow and pressure of hydrogen to the cells upon demand. The ambient air enters the system at filter 20 and flows to compressor-pump 21 which operates on DC power. A sliding vane compressor is preferred since only a small flow rate and moderate head rise is necessary. The compressor-pump supplies air at a constant rate. Therefore, a process air dump valve 22 is employed. The function of the air dump valve is to adjust the air flow through the system as the load on the fuel cell is changed. A valve found particularly suitable for the present application is shown in detail in FIGURE 3. The valve comprises a housing 30 having air inlet 31. A plurality of exhaust vents 32, or bleeding orifices remote from the air inlet, place the interior of the housing in further communication with the ambient atmosphere. A dividing means 33 having contoured valve seat 34 is disposed within the interior cavity of the housing between the air inlet 31 and vent 32 to divide the housing into two chambers of different size. The resulting smaller chamber is in communication with the ambient through the exhaust vent 32. A contoured valve 35 having an elongated plunger body 36 is disposed within the larger chamber and biased in the open position by tension spring 37 which yieldingly permits movement of the contour valve from open to close or sealing engagement with valve seat 34 as the proportional solenoid coil 38 is energized in response to increasing load upon the cell stack. When the load upon the cell stack is at a minimum the contour valve is biased by spring 37 in the fully open position and the major portion of the air produced by the sliding vane pump is vented to ambient. As the load upon the stack increases the proportional solenoid coil 38 is energized with increasing intensity and operable to move the contour valve 35 toward the closed position in response to the increasing energization.

Figure 4:
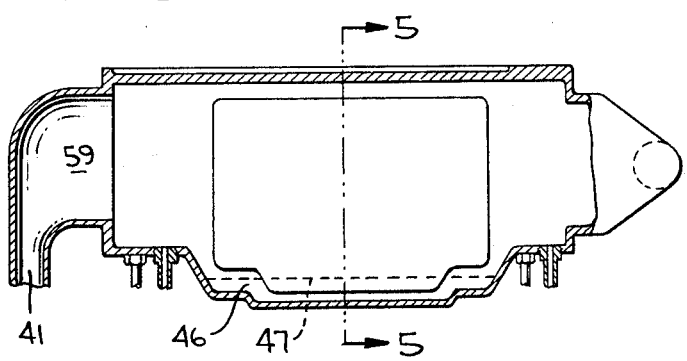
FIGURE 4 is a sectional view of an air saturator.
Figure 5:
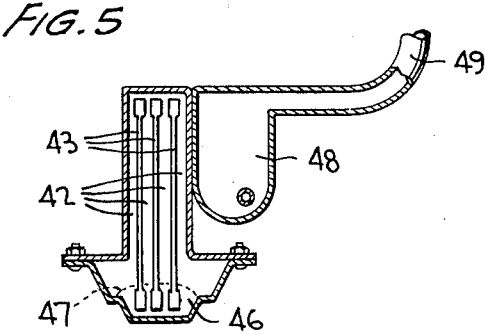
FIGURE 5 is a cross-sectional view along lines 5—5 of the saturator shown in FIGURE 4.

The proper flow of air passes to the air saturator 23 where the humidity of the air is adjusted. Thus the saturator provides a positive means of fuel cell water balance control over the range of ambient temperature and humidity expected. A wick type saturator of the type found particularly desirable in the present application is shown in FIGURES 4 and 5. This type of saturator has a minimum weight and will provide free air passage during cold start up conditions when water in the saturator may be frozen. Thus, air leaving the process air pump enters the saturator at inlet 41 and flows through a number of parallel passages 42 defined by aluminum plates 43 which function as thermal exchange elements and are lined with an absorbent wicking material, not shown. Water is evaporated from the wicking material into the air stream. The latent heat of evaporation is provided by circulating the glycol water coolant through a number of channels within aluminum plates 43. The water absorbent material or wicking material which is bonded to the outer walls of the aluminum plates extends into a water reservoir 46 at the bottom of the unit. A gasket seal 47 covers the water reservoir to ensure that all of the wicks receive an adequate supply of water if the saturator is tilted from its normal position for an extended period of time. The air and glycol water coolant are arranged for counterflow in the saturator to provide the highest possible evaporation rate. A coolant by-pass valve 24 is provided to reduce the amount of heat delivered to the saturator when the inlet air entering the saturator contains some humidity. The by-pass control senses the air temperature leaving the saturator and adjusts the by-pass flow proportionally to the rise in air temperature. A water storage tank 48 with inlet 49 is provided as part of the saturator to store the maximum possible saturator water required during any given period of operation. Water for the saturator can be replenished at the same time as the fuel is supplied to the hydrogen generator. The saturator will pass air during cold start ups as noted above and the heat from the coolant will maintain the proper saturation temperature to keep the water from freezing when the ambient temperature is below 32° F.

Figure 6:
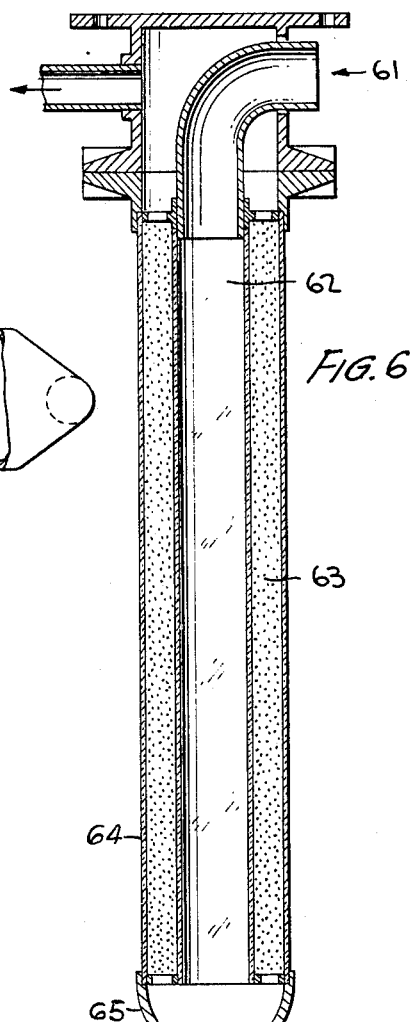
FIGURE 6 is a sectional view of a carbon dioxide scrubber of the type employed in the present power supply system.

After the air at the proper humidity leaves the air saturator it flows to the carbon dioxide scrubber unit 25. The carbon dioxide scrubber is included in the system to prevent trace amounts of carbon dioxide in the air stream from entering the fuel cell stack. Carbon dioxide in the air stream, in the event a carbonate forming electrolyte is employed, will contaminate the electrolyte and reduce the efficiency of the overall operation of the system. Air enters the scrubber from inlet 61 as shown in FIGURE 6 passes down through a center tube 62 and flows up through a soda lime bed 63. The scrubbed air then passes out the top of the scrubber and flows to the cell. The granules of soda lime in the scrubber change color from white to blue as they absorb carbon dioxide due to the presence of a suitable indicator. The color change is observed at the front of the scrubber unit which has a plexiglass case for viewing the condition of the scrubber during operation. The scrubber is designed to permit replacement of the soda lime by unclamping the lower portion 65 of the scrubber case 64. In this way the scrubber can be easily serviced without touching the piping of the assembly.

After the air leaves the carbon dioxide scrubber it is passed to the fuel cell stack 20 and by manifold means, not shown, fed to the individual fuel cells. The air which enters the air passages 7 because of the adjustment of the humidity from ambient in the saturator will collect the desired amount of water through the gas permeable cathode of the cell to maintain the water level in the cell electrolyte constant. The aforesaid eliminates problems encountered in fuel cells employing compact lightweight electrodes and electrolyte matrices caused by localized drying or flooding of the electrodes or matrices.

Figure 1:
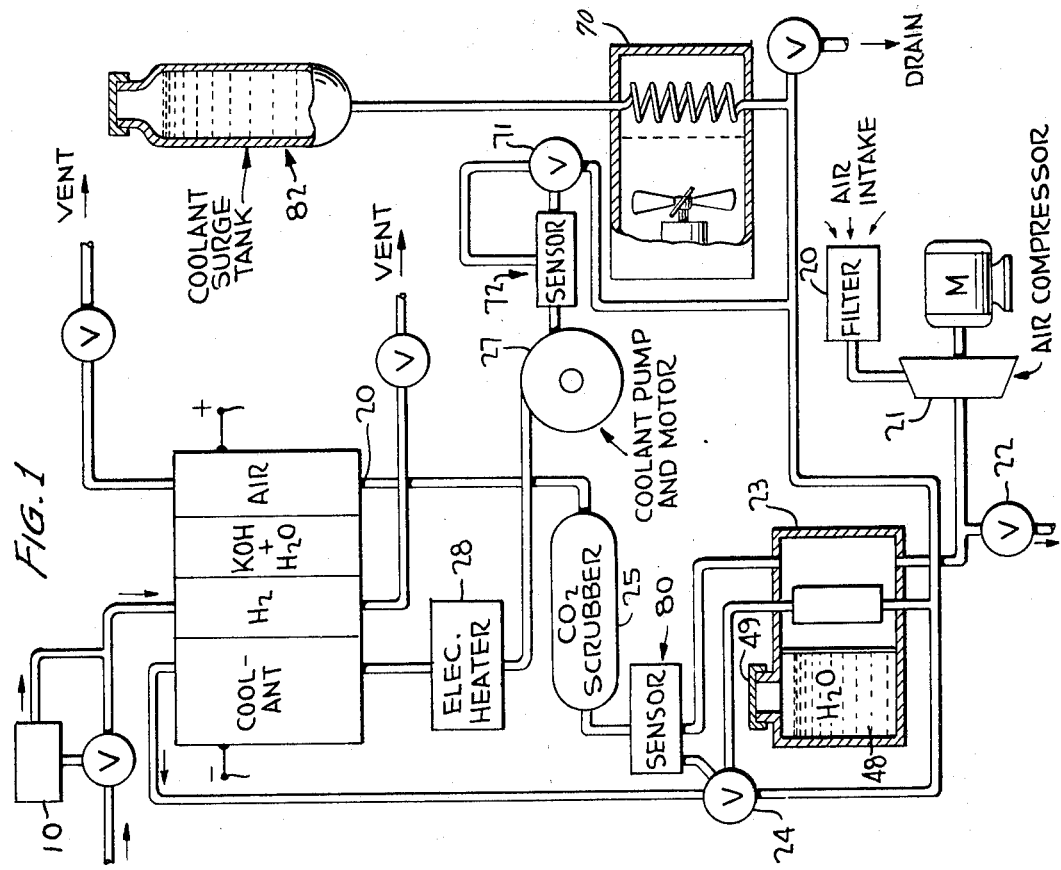
FIGURE 1 is a schematic flow diagram of the fuel cell system in accordance with the present invention.

The cooling of the system as noted hereinbefore is separated from the water removal function. The fuel cell is cooled by flowing a coolant such as a 60% aqueous solution of ethylene glycol or any other suitable dielectric coolant through the unit. The ethylene glycol which collects the sensible heat from the fuel cell, as noted hereinbefore, is utilized to maintain the air saturator at its proper temperature. More specifically the coolant is pumped by coolant pump and motor 27 through an electric heater 28 to the fuel cell. The electric heater 28 which is shown in FIGURE 1 is only used to increase the heat of the coolant particularly at start ups when the ambient temperature is extremely low. The coolant flows through the coolant passages 5 of the fuel cell. The sensible waste heat produced by the cell is removed uniformly over the cell's surface eliminating hot spots and providing heat rejection from the fuel cell assembly at the highest possible temperature. This provides a positive means of heat removal and minimizes the size of the radiator. After the coolant leaves the fuel cell stack it is conveyed to a forced air radiator or heat exchanger 70. As noted hereinbefore on the way to the radiator the coolant flows through the air saturator 23 to maintain the saturator at its proper temperature in order to control the humidity. By-pass valve 24 is provided with a sensing mechanism 80 which adjusts the coolant flow through the saturator 23 to provide a satisfactory temperature of the air entering the $CO_2$ scrubber. After leaving the saturator the coolant flows to the radiator 70. The temperature of the coolant is maintained by passing it through or by by-passing the forced air radiator by means of valve 71. The temperature is sensed by a thermal sensing mechanism 72 and in the event the coolant is at the proper temperature without being passed through the radiator, the coolant will be circulated around the radiator. A cooling surge or expansion tank 82 is provided to allow for volume changes of the coolant due to temperature.

As noted hereinbefore, the compact cell of the present system preferably utilizes lightweight electrodes in contact with an electrolyte retained in a matrix. It is apparent, however, that the described system has advantages when employed with numerous other fuel cells and various types of electrodes. Other electrodes which can be employed include the non-porous palladium/silver alloy structures described in Oswin U.S. Patent No. 3,092,517. Suitable matrices for retaining the electrolyte are the hydrophilic materials including asbestos, ceramic, plastics, and the like. The electrolyte can be an aqueous solution of an alkali hydroxide or an aqueous strong acid such as phosphoric or sulfuric acid. In the event a free flowing electrolyte is employed, the same solutions can be used. Preferably, however, if lightweight electrodes are utilized in the cell, a gas permeable hydrophobic membrane on the gas side of the electrolyte is desirable to prevent weeping or flooding. Accordingly, the reaction interface of electrode, electrolyte, and reactant gas is more readily controlled.

The non-porous cooling plates or heat exchange elements which define the coolant passages of the cell can be any suitable material which has good heat exchange properties. Suitable materials include nickel, copper, tantalum, iron, magnesium, and alloys thereof. Preferably the cooling plates or heat exchange elements will have a high surface area in order that the heat exchange is as efficient as possible. For this reason a corrugated, dimple, or etched plate is desirable. Since the cooling plate is preferably in contact at various points with the electrode surface, the plate will also serve as a take-off for the electrical current generated.

Although only one embodiment of the heat exchanger, saturator, carbon dioxide scrubber unit, air dump valve, and the like have been described in the text of the present specification, it will be apparent that devices of different construction can be employed as long as they perform the required function. Such modifications will be present to one skilled in the art.

A typical system of the type under consideration herein is as follows:

Stack:
| | |
|---|---|
| Net power output, watts | 500 |
| Gross power output, watts | 600 |
| Voltage | 28.8 |
| Current, amps | 20.8 |

Fuel cell:
| | |
|---|---|
| Cell voltage | 0.8 |
| Current density, amps/ft.$^2$ | 150 |
| Electrolyte concentration, wt. percent KOH | 30 |
| Active electrode size, in. | 4.5 x 4.5 |
| Operating temperature, max., °F. | 160 |
| Oxygen utilization, lbs. $O_2$ consumed/lb. $O_2$ in inlet air | 0.4 |
| Operating efficiency, net power/fuel consumption × LHV $H_2$ | 54.0 |
| Number of cell stacks electrically in series | 36 |
| Number of cells/stack | 12 |
| Total weight of 3–12 cell stacks, lbs. | 21.0 |

Overall stack:
| | |
|---|---|
| Dimensions | 5.20 |
| Length, in. | 5.20 |
| Width, in. | 6.0 |
| Height, in. | 6.0 |

It will be apparent from the above descriptions that the invention is not limited to the particular embodiments and materials of the construction set forth to illustrate the invention. Modifications can be made by one skilled in the art without departing from the scope of the invention disclosed. Such modifications and departures are to be covered herein with the invention only being limited in accordance with the appended claims.

What is claimed:

1. A power supply comprising, in combination, (A) a fuel cell stack having a plurality of liquid coolable fuel cell units, said cell units comprising (a) an oxidizing electrode, (b) a reducing electrode, (c) electrolyte means therebetween and (d) thermal exchanging elements in heat exchanging relationship with said electrodes; (B) means for supplying gaseous fuel to said reducing electrodes; (C) means for circulating a liquid coolant in thermal exchanging contact with said fuel cell unit thermal exchange element operable to extract sensible product heat from the cell and establish a predetermined temperature gradient across electrodes of the fuel cell; (D) means for bringing a gaseous oxidant into thermal exchange contact with a moisture source in thermal exchange contact with a proportional quantity of said circulating liquid coolant operable to establish a predetermined temperature and relative humidity to the gaseous oxidant; and (E) means for causing said gaseous oxidant of predetermined temperature and relative humidity to traverse said oxidizing electrode in contact with the surface thereof at a predetermined rate of flow of gaseous oxidant to load upon a cell stack to establish a uniform rate of evaporation of product water from the surface of said oxidizing electrode and uniform removal of said product water from the cell stack.

2. The power supply according to claim 1 wherein said means for circulating liquid coolant in thermal exchanging contact with the cell unit thermal exchange element comprises coolant pumping means, a heat exchanger exposed to ambient and adapted to liberate waste sensible heat thereto, and by-pass control means comprising a conduit to form a by-pass around said heat exchanger, a thermo-sensing means disposed in said system for sensing the temperature of the heat exchange medium and a by-pass control valve operable in response to said thermo-sensing means to proportion the flow of circulating liquid thermal exchange medium through said heat exchanger and by-pass conduit to impart a predetermined temperature range to the circulating liquid coolant at the inlet to the fuel stack.

3. A power supply according to claim 1 wherein said means for causing the gaseous oxidant to traverse the oxidizing electrode at a predetermined range of gaseous oxidant to load upon the cell stack comprises pressure means operable to produce a constant rate of flow of gaseous oxidant and a dump valve means operable to vent to ambient that portion of said constant flow of gaseous oxidant in excess of a predetermined ratio of volume of gaseous oxidant.

4. The power supply according to claim 3 wherein the gaseous oxidant dump valve comprises a valve housing, a valve seat means disposed in said housing dividing said housing into two chambers, one of said chambers being in communication with the gaseous oxidant inlet and the second chamber in communication with ambient, a valve disposed in said housing adapted to engage said valve seat when in closed position, means for biasing said valve from engagement with said seat into open position with no load upon the cell stack, and solenoid means operable to move said valve from open to closed position.

5. The power supply according to claim 4, wherein the means for biasing said valve from engagement with said seat into open position is a spring acting on one end of said valve and yieldingly permitting movement of said valve toward closed position with increasing energization of the solenoid coil means with increasing load upon the cell stack.

6. The power supply according to claim 1 wherein the means for bringing gaseous oxidant into thermal exchange contact with a moisture source in thermal exchange contact with a proportional quantity of the circulating liquid coolant comprises a housing having a gaseous oxidant inlet and outlet, a source of moisture within said housing, a thermal exchange element within said housing adapted to be in thermal exchanging contact with said circulating liquid coolant and in thermal exchange contact with said source of moisture to increase the rate of evaporation thereof, said housing embracing heat exchange element and source of moisture so as to project the flowing gaseous oxidant into thermal exchanging contact therewith; and a by-pass control means comprising a conduit to form a by-pass around said thermal exchange element in said housing, a thermal sensing means disposed in said system for sensing the temperature of the gaseous oxidant at the outlet of said housing, and a by-pass control valve operable in response to said thermo-sensing means to proportion the flow of circulating liquid thermal exchange medium through said thermal exchanging element within said housing and the by-pass conduit so as to impart to the gaseous oxidant at the outlet to said housing a predetermined temperature and relative humidity relative to the temperature gradient upon the oxidizing electrode of the cell stack.

7. A power supply comprising, in combination, (A) a hydrogen air fuel cell stack comprising a plurality of fuel cells comprising an anode, a cathode, an electrolyte positioned between said anode and cathode, a fuel chamber adjacent said anode, an oxidant chamber adjacent said cathode, means for feeding a fuel and oxidant to said respective chambers and a coolant passage between each of the plurality of cells; (B) a cooling loop containing a coolant and comprising an electric heater and radiator, means for pumping a coolant through coolant chambers in said fuel cell, means for returning said coolant from said coolant chambers and to said radiator, said means including a by-pass valve to direct the flow of a proportion of said coolant through a saturator unit; (C) a process air feed system comprising an air intake compressor and pumping means, a saturator unit for conditioning said air, a by-pass valve for regulating the amount of air being passed therethrough, a carbon dioxide scrubber unit, and means for passing air from the compressor through the by-pass valve, to the saturator, to the scrubber and to oxidant chambers in said fuel cells; and (D) a hydrogen regulating means for regulating the amount of hydrogen supplied to the fuel chambers of said fuel cell and means for passing hydrogen to said fuel chamber in said fuel cells, said units being constructed and arranged to provide a power system for operating on air at ambient temperatures of from $-45°$ F. to $125°$ F., and at any air relative humidity of from 0 to 100 percent over the full load range of said power system.

References Cited

UNITED STATES PATENTS

| | | | |
|---|---|---|---|
| 3,061,658 | 10/1962 | Blackmer | 136—86 |
| 3,112,228 | 11/1963 | Young | 136—86 |
| 3,321,334 | 5/1967 | Palmer | 136—86 |
| 3,411,951 | 11/1968 | Gelting | 136—86 |

ALLEN B. CURTIS, Primary Examiner